Figure 3:
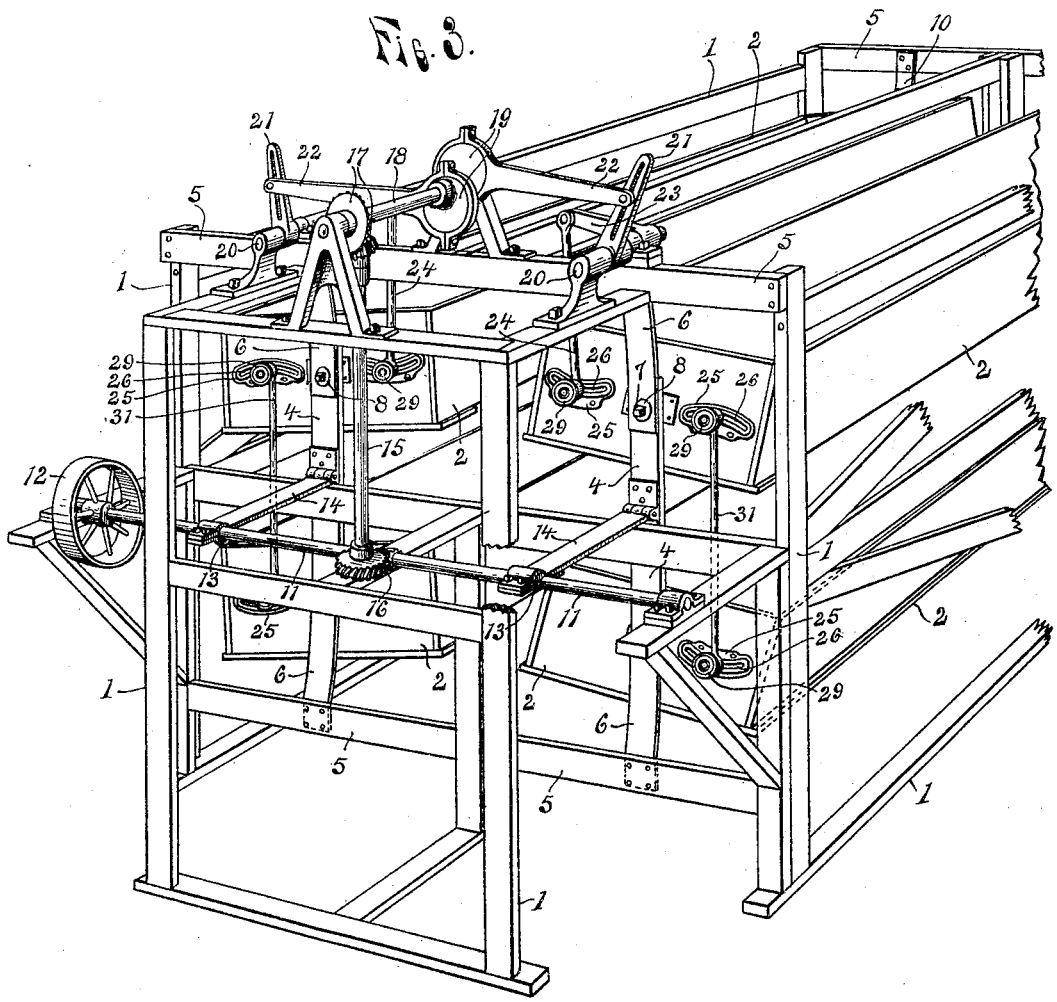

No. 798,256. PATENTED AUG. 29, 1905.
G. A. BELL.
SIFTER OR BOLTER.
APPLICATION FILED JUNE 13, 1904.
3 SHEETS—SHEET 1.
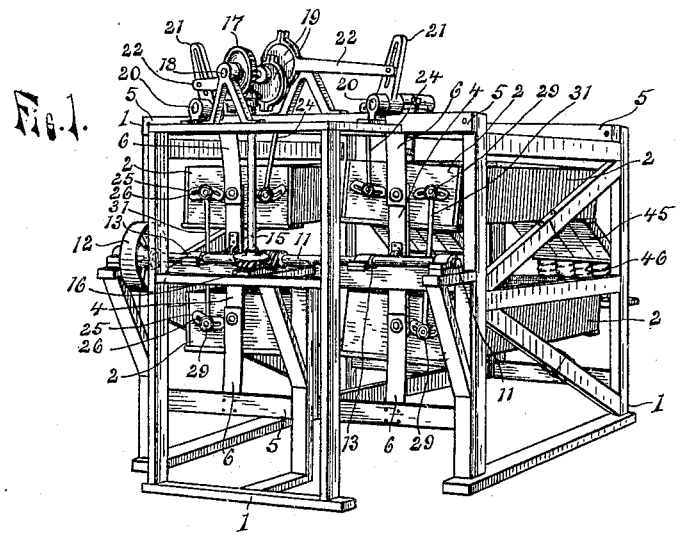

No. 798,256. PATENTED AUG. 29, 1905.
G. A. BELL.
SIFTER OR BOLTER.
APPLICATION FILED JUNE 13, 1904.

3 SHEETS—SHEET 2.

WITNESSES. INVENTOR.
George A. Bell

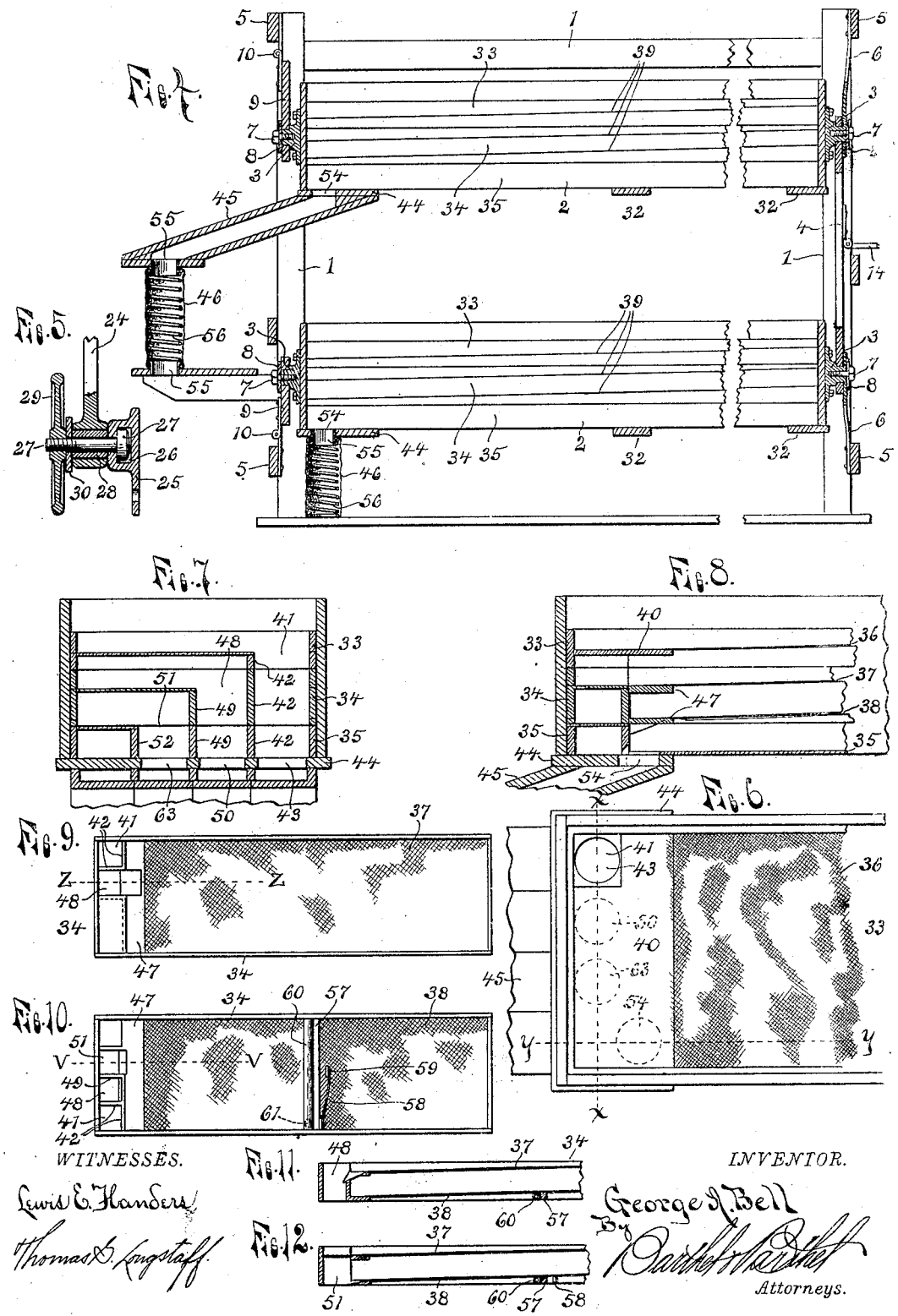

UNITED STATES PATENT OFFICE.

GEORGE A. BELL, OF YPSILANTI, MICHIGAN.

SIFTER OR BOLTER.

No. 798,256.      Specification of Letters Patent.      Patented Aug. 29, 1905.

Application filed June 13, 1904. Serial No. 212,267.

*To all whom it may concern:*

Be it known that I, GEORGE A. BELL, a citizen of the United States of America, residing at Ypsilanti, in the county of Washtenaw and State of Michigan, have invented certain new and useful Improvements in Sifters or Bolters, of which the following is a specification, reference being had therein to the accompanying drawings.

This invention relates to improvements in sifters or bolters for use in the manufacture of flour and similar products from grain which has been previously ground or crushed and is then passed through this machine to separate out the flour and middlings or whatever the products or grades may be; and its object is to provide a very simple, cheap, and compact machine for the purpose which is efficient in its operation, being so constructed and arranged that the screens or sieves are given a combined rocking and vibrating motion which rapidly separates the stock and effectually prevents the sieves from becoming clogged.

It is also an object of the invention to provide adjusting means for increasing or diminishing this movement to accelerate or retard the passage of the stock, and thus regulate the separation, and also to provide certain other new and useful features and the advantages of the particular arrangement, construction, and combination of parts, all as hereinafter more fully described, reference being had to the accompanying drawings, in which—

Figure 1 is a perspective view of a device embodying the invention, showing the front end of the machine; Fig. 2, a similar view showing the rear end thereof; Fig. 3, an enlarged perspective showing the front end. Fig. 4 is a longitudinal vertical section of the machine through the center of one set of sieve-boxes. Fig. 5 is an enlarged detail showing in section the means for adjustably securing the connecting-rods to the racks. Fig. 6 is a plan view of one end of one of the sieve-boxes with the sieves in place therein. Fig. 7 is a section on the line *x x* of Fig. 6; Fig. 8, a section on the line *y y* of Fig. 6. Fig. 9 is a plan view of the double sieve; Fig. 10, a plan view of the same inverted. Fig. 11 is a section of the double sieve on the line *z z* of Fig. 9, and Fig. 12 a similar section of the same on the line *v v* of Fig. 10.

1 is a suitable open frame, within which the sieve-boxes 2 are supported in parallel pairs, the boxes of each pair being supported, one at a distance above the other, by being provided with a trunnion 3, bolted to each end, which trunnions on one end of each pair of boxes engage openings in the ends of a bar 4, secured at its ends to the upper and lower cross-bars 5 of the frame by flexible connections consisting of flat springs 6 and secured in said openings by screw-bolts 7, tapped into the outer ends of the trunnions, each bolt being provided with a washer 8 between its heads and the trunnion to engage the outer surface of the bar. At their opposite ends the sieve-boxes are supported by the trunnions in a similar manner from the upper and lower cross-bars of the frame at that end by short bars 9, attached at one end to said cross-bars by hinges 10, and therefore the boxes are free to turn on their trunnions and to be moved a short distance longitudinally, the spring and hinge supports permitting such movement. The springs or the hinges may be used at both ends, if desired.

Extending across the forward end of the frame and supported in bearings thereon is a drive-shaft 11, provided with a drive-pulley 12 and with an eccentric 13 opposite each supporting-bar 4, to which bars the eccentric-rods 14 of said eccentrics are pivotally attached at one end, so that when the shaft is turned the racks will be vibrated longitudinally, and a vertically-extending shaft 15 receives motion from the driving-shaft by means of a worm and gear 16 and transmits it by means of bevel-gears 17 to a short horizontal shaft 18, extending longitudinally of the frame and supported in bearings thereon. On the horizontal shaft 18 are secured two eccentrics 19, and mounted in suitable bearings on the upper cross-bar 5 of the frame directly above the pivots of each pair of sieve-boxes are the rock-shafts 20, to each of which is secured an upwardly extending slotted arm 21, to which arms the eccentric-rods 22 of the eccentrics 19 are adjustably connected by bolts passing through the slot therein to impart a rocking motion to the rock-shafts. Horizontally and inwardly extending arms 23 are secured to the inner ends of the rock-shafts inside the cross-bar, and to the ends of these arms are pivotally attached one end of the connecting-rods 24, the opposite ends of said rods being adjustably and pivotally secured to the ends of the upper box of each pair at a distance to one side of their pivots by securing to the end of each box a casting 25, provided with a curved slot 26, through which extends a headed binding-bolt 27, with its head engaging the inner surface of the casting, and provided with a sleeve 28 and a hand-wheel 29 on its outer end, with a washer 30 interposed between the hub of the wheel and the sleeve to engage the rod and hold the same upon the sleeve which extends through an opening in the end of the rod. Said rod is therefore free to turn on the sleeve, and the point at which it is connected to the box may be quickly changed by turning the hand-wheel to loosen the binding-bolt, which may then be moved in the slot toward or from the pivot of the box, so that said box will be rocked a greater or lesser distance when the bolt is moved toward or from the box-pivot. The slot 26 is so curved that when the bolt is moved toward or from said pivot the box will be rocked equally in each direction from its horizontal position without the necessity of lengthening or shortening the rod, and a greater or lesser throw may be given the arm 23 by adjusting the pivot-bolt of the eccentric-rod 22 in the slot of the arm 21. The lower sieve-box of each pair is rocked by connecting it with the box above by a connecting-rod 31, said rod being pivotally secured at its ends to the boxes in the same manner that the rod 24 is attached to the upper box, so that the throw of the lower box may be changed independently of that of the upper one. Each sieve-box is a rectangular structure having side and end walls and open at its bottom, with supporting-strips 32 extending across the bottom to support the sieve-frames 33 and 34 and a detachable bottom 35 which fit therein. Stretched across the sieve-frame 33 is a screen 36, of wire fabric or other suitable material for the purpose, and in the frame 34 are two similar sieves or screens 37 and 38, of bolting-cloth or other suitable material, to separate out the different grades of stock or the middlings from the flour, these sieves being of a kind and arranged according to the kind and grade of work being done. These sieves are secured in their frames by dividing the frames longitudinally on the lines 39 (shown in Fig. 4) and securing the parts together with the sieves between, the frames being divided so that the sieves will have a slant or extend in an inclined plane in the frames, with their highest end toward the forward end of the machine.

The frame 33 (shown in plan view in Fig. 6) is provided with a strip 40, extending across at the lower end of its sieve, and in this strip is a discharge-opening at one corner communicating with a passage 41, formed by partition-walls 42 in the frames and on the bottom, leading to an opening 43 in the bottom board 44, secured to the bottom of the box at its rear end and communicating through said opening with a spout 45 or with a stocking-leg 46 to conduct the stock away. Frame 34 or the double frame is also provided with transverse strips 47 at the lower end of each of its sieves to which that end of the sieves are attached, and a discharge-opening is provided in the upper strip adjacent to the wall 42 of the passage 41 and communicates with a passage 48, formed by said wall 42 and walls 49 in said frame and on the bottom, said passage communicating, through the opening 50, with a spout or stocking-leg. The screen 38 of said frame discharges the material which it separates out through an opening in its strip 47 into a passage 51, formed by the wall 49 and wall 52 on the bottom, which passage discharges through an opening 63 in the board 44, and the stock or flour which passes through the lower or finest sieve and falls upon the bottom 35 is discharged through an opening therein, registering with an opening 54 in said board 44 and passes away through a suitable spout or stocking-leg.

The upper sieve-boxes are preferably provided with the integral spouts 45 to conduct the material outside the frame, and as these spouts rock with the boxes it is necessary to provide flexible means for conveying the material from the ends of the spouts. For this purpose what are known as "stocking-legs" 46, of fabric woven in tubular form, are attached at one end to short thimbles 55 on the spouts and at their opposite ends to similar thimbles secured in openings in a stationary shelf on the machine-frame, from which openings it may be conducted away in any suitable manner. To prevent these stocking-legs from collapsing, and thus hindering the flow of the material, a light coiled spring 56 of a size to just fit over the thimbles to which they are secured are provided to hold the stockings extended, and thus form flexible tubes. These stocking-leg conveyers may be attached directly to the boards 44 of the lower boxes, as shown, and no spouts are required.

Extending across the frame 34 beneath the fine sieve 38 is a cross-bar 57, and attached at one end to the side of said bar is a spring-arm 58, carrying at its free end a weight 59, adapted to strike against said bar as the sieve-box is vibrated and jar the said sieve to prevent its becoming clogged. At the opposite side of said cross-bar and extending parallel therewith across the frame is a tube 60, within which is a ball 61, which when the box is rocked rolls back and forth along the tube and striking the sides of the frame to which the ends of the tube are secured jars the sieve transversely.

The stock is introduced into the upper or forward ends of the boxes in any convenient manner (not shown) and will spread out over the surface of the sieve 36, gradually moving down the same, back and forth across its surface in a zigzag manner as the box is rocked. The greater the throw of the rocking motion the slower the stock will travel down the sieve and the harder it will be bolted, and by changing the throw, which can be done while in motion, the operation of the machine is regulated according to the stock being worked to get the best possible results.

A greater or lesser number of sieves may be used, as desired, the passage from each sieve being arranged accordingly, and the frames may have one or more sieves each, as desired. As the frames are simply set into their sieve-boxes, they may be readily removed for cleaning or repair and each box may be provided with a removable cover, (not shown,) if found desirable. For convenience and economy of space the boxes are arranged in pairs, one above the other, and these pairs are arranged side by side; but as each box does its work independently of all the others one or more boxes may be used and they may be arranged in any desired manner, two or more arranged in tiers, one above the other, and any number of tiers in a frame. By arranging the boxes as shown and operating one pair in the opposite direction to that of the other they balance each other and make a smooth-running machine, the balanced eccentrics being set slightly off center to do away with the jarring.

Having thus fully described my invention, what I claim is—

1. In a sifter or bolter, the combination with the supporting-frame, of flat springs secured to said frame at one end and provided with pivot-bearings near their opposite ends, sieve-boxes having trunnions on their ends engaging the bearings on the springs, sieves in said boxes, means for rocking the boxes on their trunnions, a driving-shaft and a cam on said shaft, operating to flex said springs to vibrate the boxes.

2. In a bolter or sifter, the combination with a supporting-frame; of a pair of sieve-boxes pivotally supported at each end on said frame, one above the other, sieves in said boxes, a connecting-rod pivotally attached at one end to one box at one side of its pivot, a plate on the end of the other box at one side of its pivot having a slot curved concentrically with the point of attachment of the rod to the other box, means for pivotally and adjustably securing the end of said rod in said slot and means for operating the sieve-boxes.

3. In a bolter or sifter, the combination with a supporting-frame, of a sieve-box pivotally supported at each end on said frame, sieves in said box, a rock-shaft mounted in bearings on the frame, an arm on said rock-shaft, a connecting-rod attached at one end to said arm, a casting secured to the end of the box at one side of its pivot and provided with a curved slot, a binding-bolt in said slot, a sleeve on said bolt extending through an opening in the opposite end of said rod, a hand-wheel on the bolt, and means for actuating the rock-shaft.

4. In a bolter or sifter, the combination with a supporting-frame, of rectangular sieve-boxes pivotally supported at their ends on said frame and arranged one above the other, sieves in said boxes, a shaft mounted in bearings on the frame, an eccentric on said shaft, a rock-shaft mounted on the frame above the upper rack, a slotted arm on said rock-shaft, an eccentric-rod adjustably secured at one end to said arm by a bolt passing through a slot therein, a second arm on the rock-shaft, a rod pivotally connected at one end to said second arm and at its opposite end pivotally and adjustably attached to the end of the upper box at one side of its pivot, and a connecting-rod pivotally and adjustably attached at one end to the upper box at the opposite side of its pivot and at its opposite end to the box below.

5. In a bolter or sifter, the combination with an open supporting-frame, of yielding supports at each end of said frame, rectangular sieve-boxes arranged in pairs, one above the other and said pairs extending side by side, each box being pivotally supported by said yielding supports, a driving-shaft mounted in bearings on the frame, an eccentric on said shaft opposite each pair of boxes and set to vibrate each pair of boxes in opposite directions, a horizontally-extending shaft mounted in bearings on the frame, a vertical shaft to transmit motion from said driving-shaft to the horizontal shaft, eccentrics on said horizontal shaft set opposite each other, rock-shafts on the frame above each pair of boxes, arms on said rock-shafts, eccentric-rods connecting said eccentrics with one set of arms on the rock-shafts, rods attached at one end to another set of arms on the rock-shafts and at their opposite ends to the ends of the upper boxes, connecting-rods connecting the upper and lower boxes of each pair, and sieves in said boxes.

6. In a bolter or sifter, the combination with a supporting-frame; of a sieve-box pivotally supported at each end on said frame, sieves in said box, a rock-shaft mounted in bearings on the frame, an arm on said rock-shaft extending laterally therefrom, a connecting-rod attached at one end to said arm, a plate on the end of the box having a curved slot within which the other end of said rod is pivotally and adjustably secured, whereby the point of attachment of the rod to the box may be adjusted toward or from the pivot of the box to vary the throw of the box, and means for actuating the rock-shaft.

7. In a bolter or sifter, the combination with a supporting-frame; of a pair of sieve-boxes pivotally supported at each end on said frame, one above the other, sieves in said boxes, a rock-shaft mounted in bearings on the frame, an arm on said rock-shaft extending laterally therefrom, a connecting-rod attached at one end to said arm, a plate on the end of the upper box having a curved slot within which the other end of said rod is pivotally and adjustably secured to vary the throw of the box, a second plate having a curved slot secured to the end of the upper box on the opposite side of its pivot, a connecting-rod pivotally and adjustably attached to said plate, a plate on the same end of the lower box at one side of its pivot having a slot curved concentrically with the point of attachment of the rod to the upper box, means for pivotally and adjustably securing the end of said rod in said slot and means for actuating the rock-shaft.

In testimony whereof I affix my signature in presence of two witnesses.

GEORGE A. BELL.

Witnesses:
OTTO F. BARTHEL,
THOMAS G. LONGSTAFF.